March 18, 1930.　　　　G. HARROLD　　　　1,750,888
ADJUSTABLE CURTAIN FOR AUTOMOBILES
Filed April 5, 1928
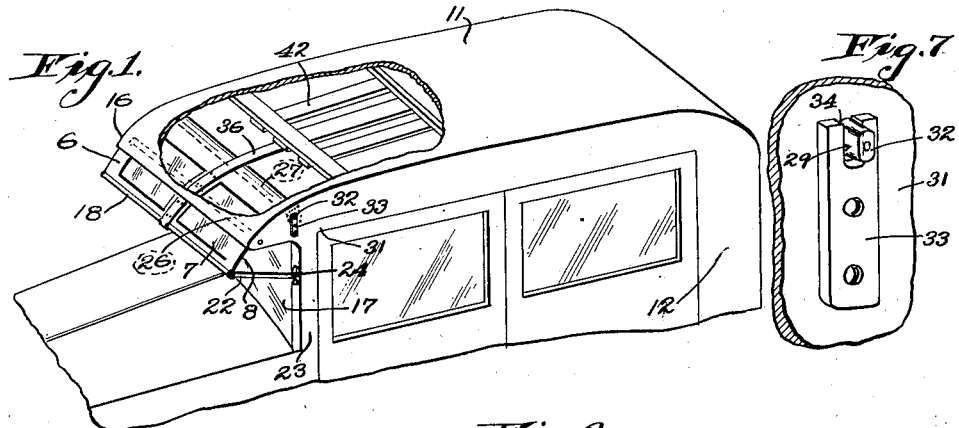
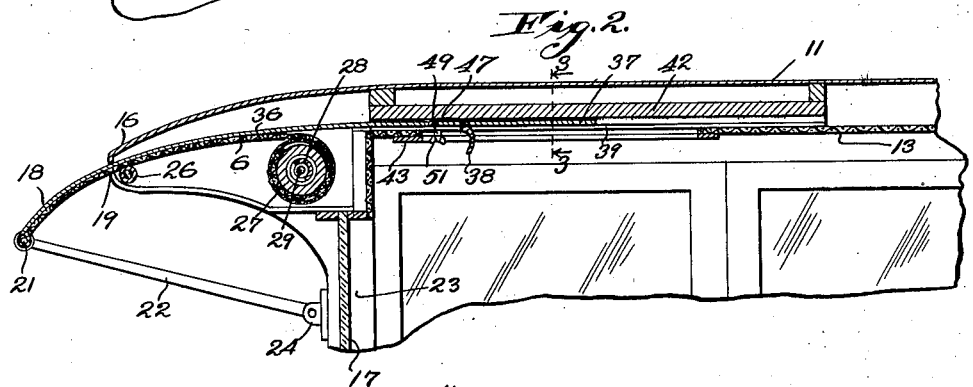
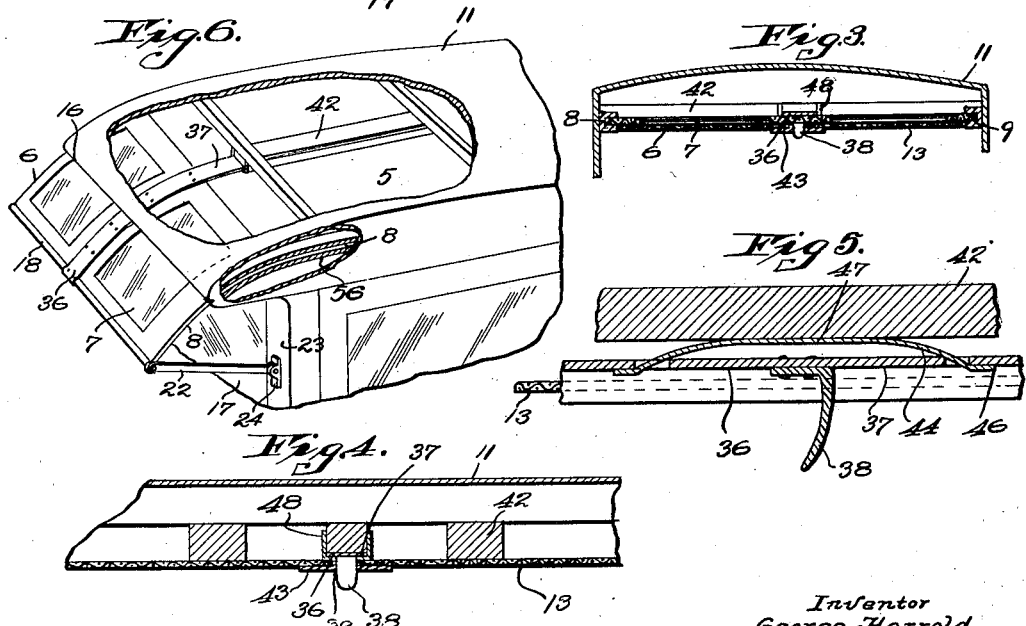
Inventor
George Harrold
by Hazard and Miller
Attorneys Patented Mar. 18, 1930

1,750,888

UNITED STATES PATENT OFFICE

GEORGE HARROLD, OF LOS ANGELES, CALIFORNIA

ADJUSTABLE CURTAIN FOR AUTOMOBILES

Application filed April 5, 1928. Serial No. 267,507.

This invention relates to improvements in adjustable curtains for vehicles, and more especially to an adjustable visor for automobiles.

An object of the invention is the provision of an automobile visor which is readily adjustable to any desired height.

A further object is the provision of such a visor, the adjustment of which may be effected from within the vehicle and without the necessity of the driver leaving his seat to operate the adjusting means.

A further object is the provision of an adjustable visor provided with one or more windows of colored, transparent material and so mounted that it may be placed in such a position that one of these windows is directly in the line of sight of the driver, with the result that the glare of the sun or oncoming headlights does not hinder the driver's observation of the roadway.

Another object is the provision of means for stowing the adjustable curtain out of the way when in retracted position.

With the foregoing and other objects in view which will be made manifest in the following detailed description and specifically pointed out in the appended claims, reference is had to the accompanying drawings for an illustrative embodiment of the invention, wherein:

Figure 1 is a perspective view of the top of an automobile, a portion of which is broken away to reveal the manner of mounting my improved, adjustable curtain therein.

Fig. 2 is a vertical, longitudinal, sectional view of the top of an automobile, with my improved curtain mounted therein.

Fig. 3 is a vertical, transverse, sectional view taken upon the line 3—3 of Fig. 2, and the direction of view being indicated by the arrows.

Fig. 4 is an enlarged, transverse, vertical, sectional view of a portion of the device showing the curtain operating means which are accessible from the interior of the vehicle.

Fig. 5 is an enlarged, detailed, sectional view showing the spring associated with the curtain for exerting frictional resistances against movement thereof.

Fig. 6 is a perspective view of a portion of the top of a vehicle with a portion thereof broken away to better reveal the manner of mounting a modified form of my improved adjustable curtain therein.

Fig. 7 is an enlarged, detailed view in perspective, showing the bracket attached to the outside of the top for locking the spring tensioning means.

In terms of broad inclusion, the present invention contemplates an adjustable curtain construction comprising a movable curtain which may be retracted within the top of a vehicle or extended from an edge thereof to serve as a visor for a window of the vehicle. The curtain is adapted to be adjusted to any desired position from within the vehicle, and preferably from a point convenient to the hand of the driver. The curtain is provided with one or more colored, transparent windows which are adapted to be positioned directly in line of sight of the driver, to minimize the glare of oncoming headlights or the sun.

In greater detail, the invention is shown in the drawings and described herein as comprising a curtain 6 of suitable flexible, and preferably semi-resilient material such as imitation leather or the like. It is provided with one or more windows 7 which are transparent and colored.

The side edges 8 of the curtain 6 are slidably received within guides 9 which are positioned inside the top 11 of the vehicle 12 and concealed above the upholstery 13, it being understood that one of the guides 9 is positioned upon each side of the top 11, with the result that the curtain 6 is substantially of the same width as the top 11.

The forward edge 16 of the top 11 is extended beyond the windshield 17 to provide a visor; and the forward or outer edge 18 of the curtain 6 extends through a slot 19 in the forward edge of the visor. A rod 21 is secured to the forward edge 18 of the curtain 6, and is supported at each end by an arm 22, these arms 22 being pivoted upon the corner posts 23 of the vehicle 12 through the expedient of the hinged brackets 24. A roller 26 extends transversely of the visor just inside the slot 19 to decrease the frictional resistance against movement of the curtain 6 through the slot 19.

A spring-urged roller 27 extends transversely of the top 11 and has the inner edge of the curtain 6 attached thereto so that when the roller 27 is rotated by the spring 28 associated therewith, the curtain 6 will be wound thereupon. Means for tensioning the spring are provided in the form of a rod 29 within the roller 27 and extending through the side 31 of the top 11. One end of the spring 28 is secured to the rod 29 and the other end is secured to the roller 27. The end 32 of the rod 29 is squared to receive a wrench or winding key for tensioning the spring 28, and when this has been accomplished, a bracket 33 bifurcated at its upper end to provide a slot 34, may be attached to the side 31 in position to receive the squared end 32 within the slot 34 and hold the rod 29 against the unwinding action of the spring 28.

Means for adjusting the curtain 6 from within the vehicle are provided. A flexible and preferably resilient strip 36 of any suitable material such as sheet steel is secured to and extends longitudinally of the curtain 6, preferably midway between its side edges 8. The forward end of the strip 36 serves to impart rigidity to the extended portion of the curtain 6, and the after end 37 of the strip is extended beyond the inner edge of the curtain within the top 11. An operating handle 38 extends rigidly downward from the end 37 of the strip 36, through a slot 39 in the upholstery 13 lining the framework 42 which supports the top 11. A suitable slotted plate 43 may be secured around the slot 39 to hold the edges of the upholstery 13 in place with the operating handle 38 extending therethrough.

A spring 44 may be secured at both ends 46 to the strip 36, with its center portion 47 pressed upwards against one of the members of the framework 42 to increase the frictional resistance against movement of the curtain 6. A channel 48 is secured to the same member of the framework 42 with the strip 36 slidably retained therebetween, with the result that this member serves as a track to limit the movement of the strip 37 to movement longitudinally of the vehicle 11.

A bolt 49 extends rigidly downward from the strip 36 through the slot 39; and a wing nut 51 threaded upon the bolt 49 may be tightened against the plate 43 to lock the strip 36 and curtain 6 in adjusted position.

The manner of operating my improved adjustable curtain is substantially as follows: The normal position of the curtain is in fully retracted position, wherein the major portion of the curtain is wound upon the roller 27. When so positioned, the strip 36 will be in fully retracted position with the operating handle 38 at the rear end of the slot 39. When it is desired to adjust the curtain 6 to shield the eyes of the occupants of the vehicle, the thumb nut 51 may be loosened to permit the strip 36 and curtain 6 to be moved by means of the operating handle 38. If the adjustment of the curtain 6 is merely for the purpose of protecting the eyes of the occupants of the vehicle from the rays of the sun, the curtain will probably be shifted only a few inches below the edge of the visor 16 or to the position indicated in Figs. 1 and 2.

However, if the eyes of the driver or other occupants of the car are blinded by oncoming headlights, the curtain 6 may be extended so far that the windows 7 are directly in their line of sight so that in observing the roadway ahead of the vehicle, they may look through the colored transparent windows 7 to kill the glare. It is to be understood of course, that the curtain 6 may be locked in any adjusted position simply by tightening the thumb nut 51 against the plate 43.

The embodiment of the invention shown in Fig. 6 is in all respects, similar to that already described, with the exception that instead of being wound upon a roller, the guides 56 extend straight back within the top 11 far enough to accommodate the entire curtain 6 when in retracted position, and stow it flat above the upholstery 13. This modification of course, operates in precisely the same manner as that already described.

Various changes in the details of construction may be made without departing from the spirit and scope of the invention as defined by the appended claims.

I claim:

1. In combination with a vehicle having a window and a top, an adjustable curtain construction comprising a movable curtain, a resilient strip secured to and extending longitudinally of the curtain, said strip being extended beyond the inner edge of the curtain within the top, and an operating handle carried by said strip and extending through a slot in the top into the vehicle whereby the curtain may be slid to extend its outer edge through an edge of the top over said window.

2. In combination with a vehicle having a window and a top, an adjustable curtain construction comprising a movable curtain, a resilient strip secured to and extending longitudinally of the curtain to strengthen the extended end thereof, said strip being extended beyond the inner edge of the curtain within the top, an operating handle carried by said strip and extending through a slot in the top into the vehicle whereby the curtain may be slid to extend its outer edge through an edge of the top over said window, and arms pivoted to said vehicle to support the extended end of said curtain as a visor.

3. In combination with a vehicle having a window and a top, an adjustable curtain construction comprising a movable curtain, a resilient strip secured to and extending longitudinally of the curtain to strengthen the extended end thereof, said strip being extended beyond the inner edge of the curtain within the top, an operating handle carried by said strip and extending through a slot in the top into the vehicle whereby the curtain may be slid to extend its outer edge through an edge of the top over said window, and means for clamping said strip in adjusted position.

4. In combination with a vehicle having a window and a top, an adjustable curtain construction comprising a movable curtain, a resilient strip secured to and extending longitudinally of the curtain to strengthen the extended end thereof, said strip being extended beyond the inner edge of the curtain within the top, an operating handle carried by said strip and extending through a slot in the top into the vehicle whereby the curtain may be slid to extend its outer edge through an edge of the top over said window, arms pivoted to said vehicle to support the extended end of said curtain as a visor, and means for clamping said strip in adjusted position.

5. In combination with a vehicle having a window and a top, an adjustable curtain construction comprising a movable curtain, a colored transparent window in said curtain, a resilient strip secured to and extending longitudinally of the curtain to strengthen the extended end thereof, said strip being extended beyond the inner edge of the curtain within the top, and an operating handle carried by said strip and extending through a slot in the top into the vehicle whereby the curtain may be slid to extend its outer edge through an edge of the top over said window.

6. In combination with a vehicle having a window and a top, an adjustable curtain construction comprising a movable curtain, a colored, transparent window in said curtain, a resilient strip secured to and extending longitudinally of the curtain to strengthen the extended end thereof, said strip being extended beyond the inner edge of the curtain within the top, an operating handle carried by said strip and extending through a slot in the top into the vehicle whereby the curtain may be slid to extend its outer edge through an edge of the top over said window, and means for clamping said strip in adjusted position.

7. In combination with a vehicle having a window and a top, an adjustable curtain construction comprising a movable curtain, a resilient strip secured to and extending longitudinally of the curtain to strengthen the extended end thereof, said strip being extended beyond the inner edge of the curtain within the top, an operating handle carried by said strip and extending through a slot in the top into the vehicle whereby the curtain may be slid to extend its outer edge through an edge of the top over said window, and a spring-urged roller revolubly mounted transversely of the top with said curtain wound thereupon to stow the curtain when retracted.

In testimony whereof I have signed my name to this specification.

GEORGE HARROLD.